US012206206B2

(12) United States Patent
Kataoka et al.

(10) Patent No.: US 12,206,206 B2
(45) Date of Patent: Jan. 21, 2025

(54) WIRE COVER-EQUIPPED CONNECTOR

(71) Applicant: SUMITOMO WIRING SYSTEMS, LTD., Mie (JP)

(72) Inventors: Daisuke Kataoka, Mie (JP); Kazuo Nakai, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 313 days.

(21) Appl. No.: 17/912,719

(22) PCT Filed: Mar. 2, 2021

(86) PCT No.: PCT/JP2021/007798
§ 371 (c)(1),
(2) Date: Sep. 19, 2022

(87) PCT Pub. No.: WO2021/192833
PCT Pub. Date: Sep. 30, 2021

(65) Prior Publication Data

US 2023/0138081 A1 May 4, 2023

(30) Foreign Application Priority Data

Mar. 23, 2020 (JP) ................................ 2020-050572

(51) Int. Cl.
*H01R 13/56* (2006.01)
*H01R 13/506* (2006.01)
*H01R 13/58* (2006.01)

(52) U.S. Cl.
CPC .......... *H01R 13/56* (2013.01); *H01R 13/506* (2013.01); *H01R 13/58* (2013.01)

(58) Field of Classification Search
CPC ....... H01R 13/56; H01R 13/506; H01R 13/58
See application file for complete search history.

(56) References Cited

U.S. PATENT DOCUMENTS 5,735,702 A 4/1998 Hio
10,680,378 B2 * 6/2020 Miyazawa ......... H01R 13/5213
(Continued)

FOREIGN PATENT DOCUMENTS

JP 2004-199990 A 7/2004
JP 2009-037769 A 2/2009
(Continued)

OTHER PUBLICATIONS

International Search Report issued on May 18, 2021 for WO 2021/192833 A1 (4 pages).

*Primary Examiner* — Briggitte R. Hammond
(74) *Attorney, Agent, or Firm* — Venjuris, P.C.

(57) ABSTRACT

Provided is a wire cover-equipped connector that can prevent a wire from being caught on a wire cover when the wire cover is being attached. The wire cover-equipped connector includes: a housing including a wire lead-out surface; and a wire cover configured to be disposed on the housing so as to cover the wire lead-out surface. The housing includes a slide-receiving portion at a position in line with the wire lead-out surface, the wire cover includes a slide portion configured to slide against the slide-receiving portion, and a wire escape space formed so as to be separated from the slide-receiving portion, and the slide portion includes, in a front end thereof in a sliding direction of sliding against the slide-receiving portion, a wire guiding portion inclined in a direction opposite to the sliding direction while extending toward the wire escape space.

5 Claims, 9 Drawing Sheets

(56) References Cited

U.S. PATENT DOCUMENTS

| | | | |
|---|---|---|---|
| 2006/0281350 A1 | 12/2006 | Yamamoto | |
| 2011/0014805 A1 | 1/2011 | Sakamaki et al. | |
| 2011/0230106 A1* | 9/2011 | Shamoto .......... | H01R 13/62938 439/892 |
| 2019/0296484 A1 | 9/2019 | Suzuki et al. | |

FOREIGN PATENT DOCUMENTS

| | | |
|---|---|---|
| JP | 2013-161530 A | 8/2013 |
| JP | 2017-157416 A | 9/2017 |

* cited by examiner

WIRE COVER-EQUIPPED CONNECTOR

CROSS REFERENCE TO RELATED APPLICATIONS

This application is a national phase of PCT application No. PCT/JP2021/007798, filed on 2 Mar. 2021, which claims priority from Japanese patent application No. 2020-050572, filed on 23 Mar. 2020, all of which are incorporated herein by reference.

TECHNICAL FIELD

The present disclosure relates to a wire cover-equipped connector.

BACKGROUND

Conventionally, a wire cover-equipped connector in which a wire cover is attached to a wire lead-out surface of a housing is known. The wire cover covers the wire lead-out surface of the housing, and houses wires therein. The wires are bent in a predetermined direction inside the wire cover.

The wire cover is attached to the housing after terminal fittings have been housed in the housing. For example, in the wire cover-equipped connectors disclosed in Patent Documents 1 to 5 below, a wire cover is moved along a wire lead-out surface and attached to a housing. The wire cover is locked to the housing upon being moved to a prescribed attachment position.

PRIOR ART DOCUMENT

Patent Document

Patent Document 1: JP 2019-169326 A
Patent Document 2: JP 2004-199990 A
Patent Document 3: JP 2013-161530 A
Patent Document 4: JP 2017-157416 A
Patent Document 5: JP 2009-245609 A

SUMMARY OF THE INVENTION

Problems to be Solved

Incidentally, there are cases where, when a wire cover is moved along a wire lead-out surface to be attached to a housing as described above, a wire is caught on the wire cover as the wire cover is being moved. If a wire is caught on the wire cover, problems arise including the operation of attaching the wire cover taking longer due to the wire being pinched between the wire cover and the housing.

Thus, it is an object of the present disclosure to provide a wire cover-equipped connector that can prevent a wire from being caught on a wire cover when the wire cover is being attached.

Means to Solve the Problem

A wire cover-equipped connector according to the present disclosure is a wire cover-equipped connector including: a housing including a wire lead-out surface; and a wire cover configured to be disposed on the housing so as to cover the wire lead-out surface, wherein the housing includes a slide-receiving portion at a position in line with the wire lead-out surface, the wire cover includes a slide portion configured to slide against the slide-receiving portion, and a wire escape space formed so as to be separated from the slide-receiving portion, and the slide portion includes, in a front end thereof in a sliding direction of sliding against the slide-receiving portion, a wire guiding portion inclined in a direction opposite to the sliding direction while extending toward the wire escape space.

Effect of the Invention

With the present disclosure, it is possible to provide a wire cover-equipped connector that can prevent a wire from being caught on a wire cover when the wire cover is being attached.

DETAILED DESCRIPTION TO EXECUTE THE INVENTION

Description of Embodiments of Present Disclosure

Figure 1:
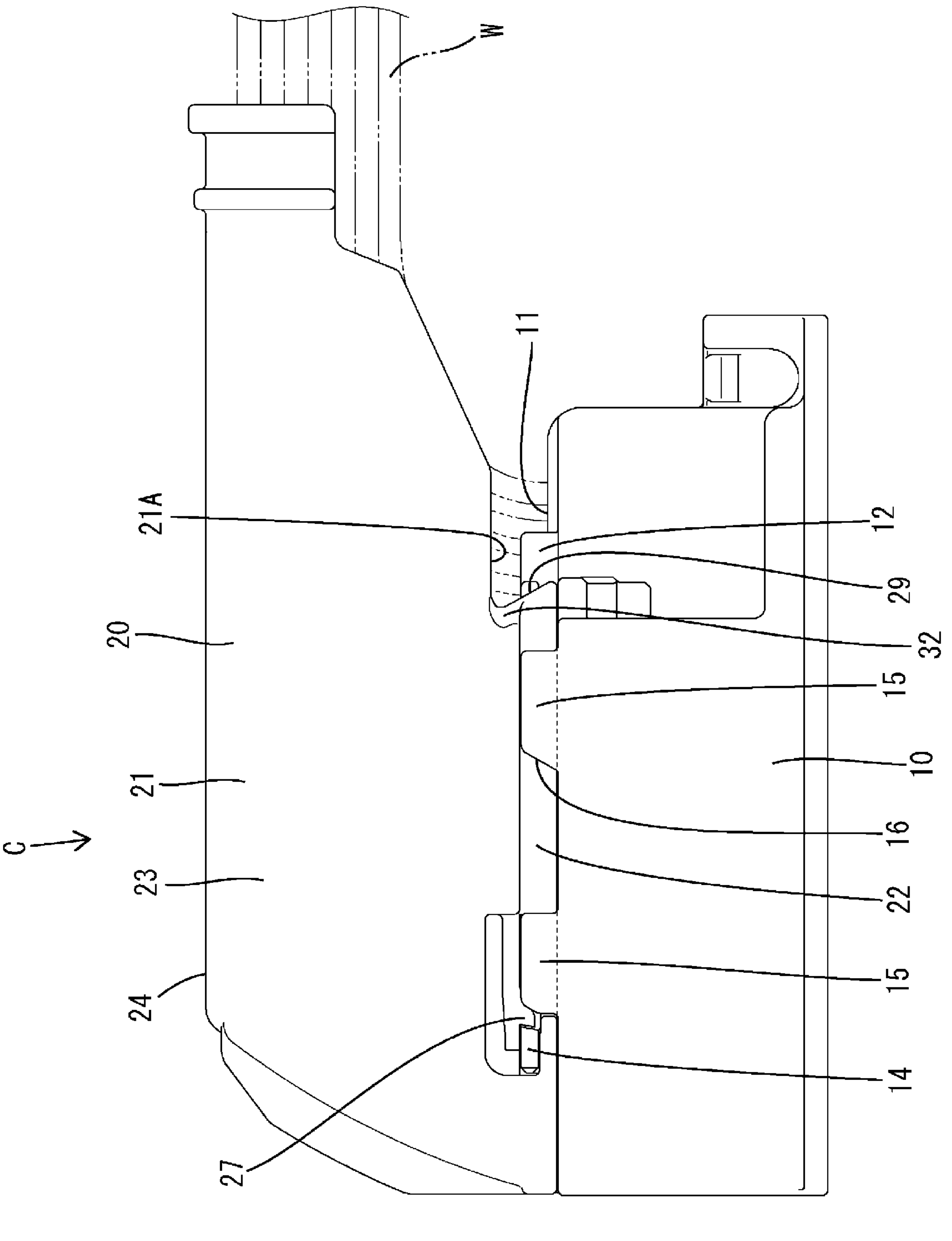
FIG. 1 is a side view of a wire cover-equipped connector according to an embodiment.

First, embodiments of the present disclosure will be listed and described below.

(1) A wire cover-equipped connector according to the present disclosure is a wire cover-equipped connector including: a housing including a wire lead-out surface; and a wire cover configured to be disposed on the housing so as to cover the wire lead-out surface, wherein the housing includes a slide-receiving portion at a position in line with the wire lead-out surface, the wire cover includes a slide portion configured to slide against the slide-receiving portion, and a wire escape space formed so as to be separated from the slide-receiving portion, and the slide portion includes, in a front end thereof in a sliding direction of sliding against the slide-receiving portion, a wire guiding portion inclined in a direction opposite to the sliding direction while extending toward the wire escape space. With such a configuration, when the wire cover is being attached to the housing, a wire located forward of the slide portion of the wire cover is guided to the wire escape space by the wire guiding portion formed so as to be separated from the slide-receiving portion. Accordingly, when the wire cover is being attached, the wire can be prevented from being caught on the wire cover.

(2) The slide-receiving portion may be a wall provided at a position where the slide-receiving portion overlaps the slide portion in an inner/outer direction of the wire cover. With this configuration, when the wire cover is being attached, a wire that has come in contact with the wire guiding portion moves along the incline of the wire guiding portion and into the wire escape space, and thus the wire is prevented from being pinched between the slide-receiving portion and the slide portion.

(3) It is preferable that the slide-receiving portion protrudes in a lead-out direction in which the wire is lead out from the wire lead-out surface, and the wire escape space is formed at a position shifted in the lead-out direction of the wire relative to a protruding end of the slide-receiving portion. With this configuration, the wire is moved to a position shifted away from the slide-receiving portion, and thus the wire can be prevented from being pinched between the wire cover and the housing.

(4) It is preferable that the slide portion includes, in the front end thereof in the sliding direction, an escape recess that is recessed rearward in the sliding direction. With this configuration, the wire is moved to the escape recess formed in the front end of the slide portion, and thus the wire can be prevented from being pinched between the slide portion and the slide-receiving portion.

(5) It is preferable that the-receiving portion includes an inclined second guiding portion inclined inward in the wire cover while extending forward in the sliding direction. With this configuration, when a wire comes in contact with the second guiding portion provided in the slide-receiving portion, the wire is guided into the wire cover. Accordingly, when the wire cover is being attached, a wire can be prevented from being caught on the wire cover.

Detailed Description of Embodiment of the Present Disclosure

Specific examples of a wire cover-equipped connector C of the present disclosure will be described below with reference to the drawings. Note that the present invention is not limited to these illustrative examples, but is indicated by the claims, and all changes that come within the meaning and range of equivalency of the claims are intended to be embraced therein.

As shown in FIG. 1, the wire cover-equipped connector C includes a housing 10 and a wire cover 20. The housing 10 has a wire lead-out surface 11 from which wires W are lead out. The wire lead-out surface 11 is provided with opening portions from which the wires W are lead out, and by leading out the wires W from these opening portions, the wires W extend out from the wire lead-out surface 11. The wire cover 20 covers the wire lead-out surface 11 and houses the wires W therein.

Below, for each of the constituent members, the side on which the wire cover 20 is attached (upper side in FIG. 1) is the upper side, and the side opposite to the side on which the wire cover 20 is attached (lower side in FIG. 1) is the lower side. The forward side in the direction in which the wire cover 20 is moved when attaching the wire cover 20 to the housing 10 (right side in FIG. 1) is the front side, and the rear side in the direction in which the wire cover 20 is moved when attaching the wire cover 20 to the housing 10 (left side in FIG. 1) is the rear side. Also, in the following description, the near side in a direction orthogonal to the sheet plane of FIG. 1 is the right side, and the far side is the left side. Note that the position of the wire cover 20 in FIG. 1 is the position of the wire cover 20 once it has been moved and attached to the housing 10.

Figure 2:
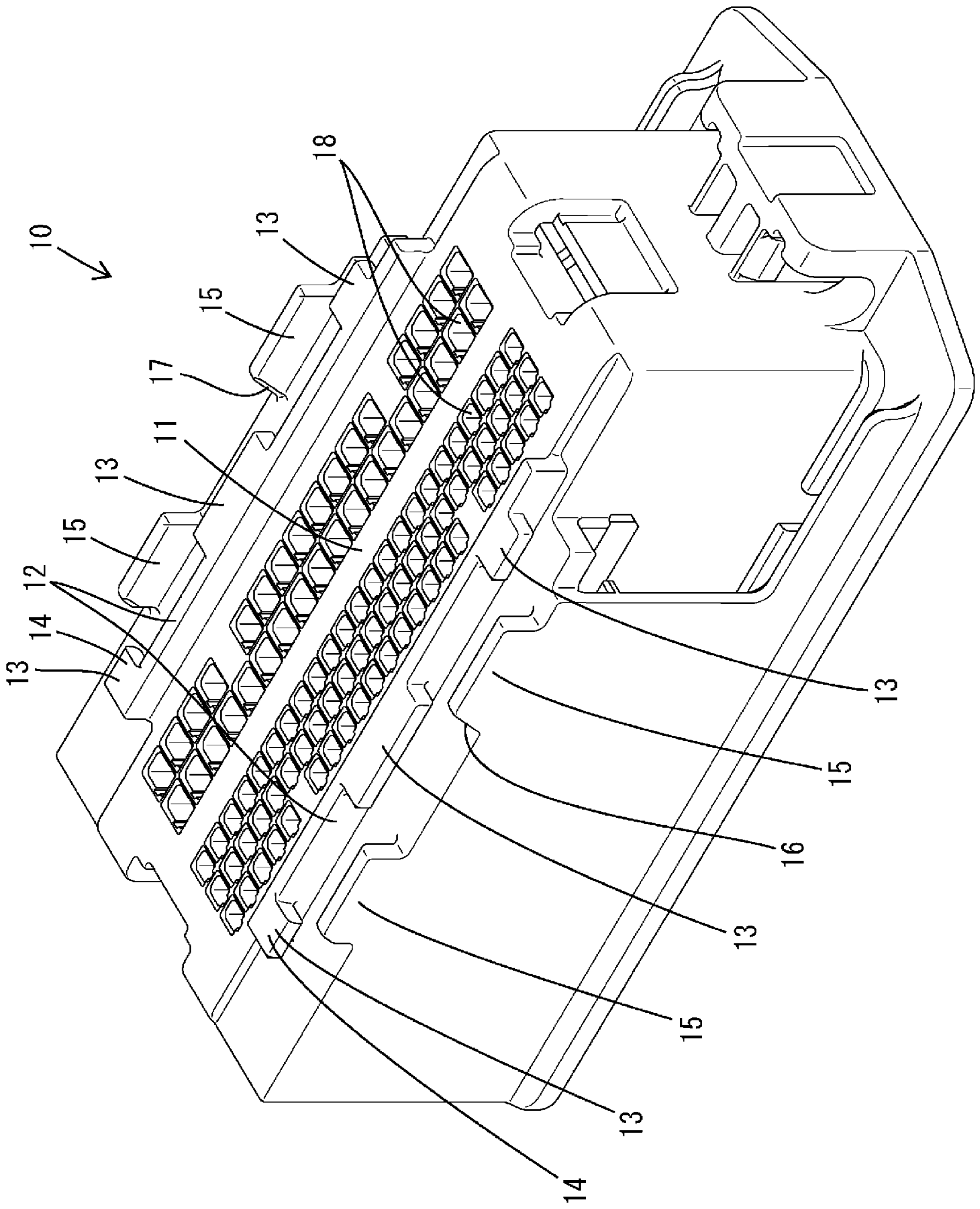
FIG. 2 is a perspective view of a housing.

The housing 10 is made of a synthetic resin. The housing 10 has an elongated shape in the front-rear direction. As shown in FIG. 2, the housing 10 is provided with terminal housing chambers 18 that each house a terminal fitting. The terminal housing chambers 18 are arranged in the front-rear direction and the left-right direction.

Terminal fittings are housed in the terminal housing chambers 18 from above. Each terminal fitting is connected to a terminal end of a wire W. The wires W extend out upward from the wire lead-out surface 11 of the housing 10. A bundle of wires W are bent forward inside the wire cover 20.

Figure 3:
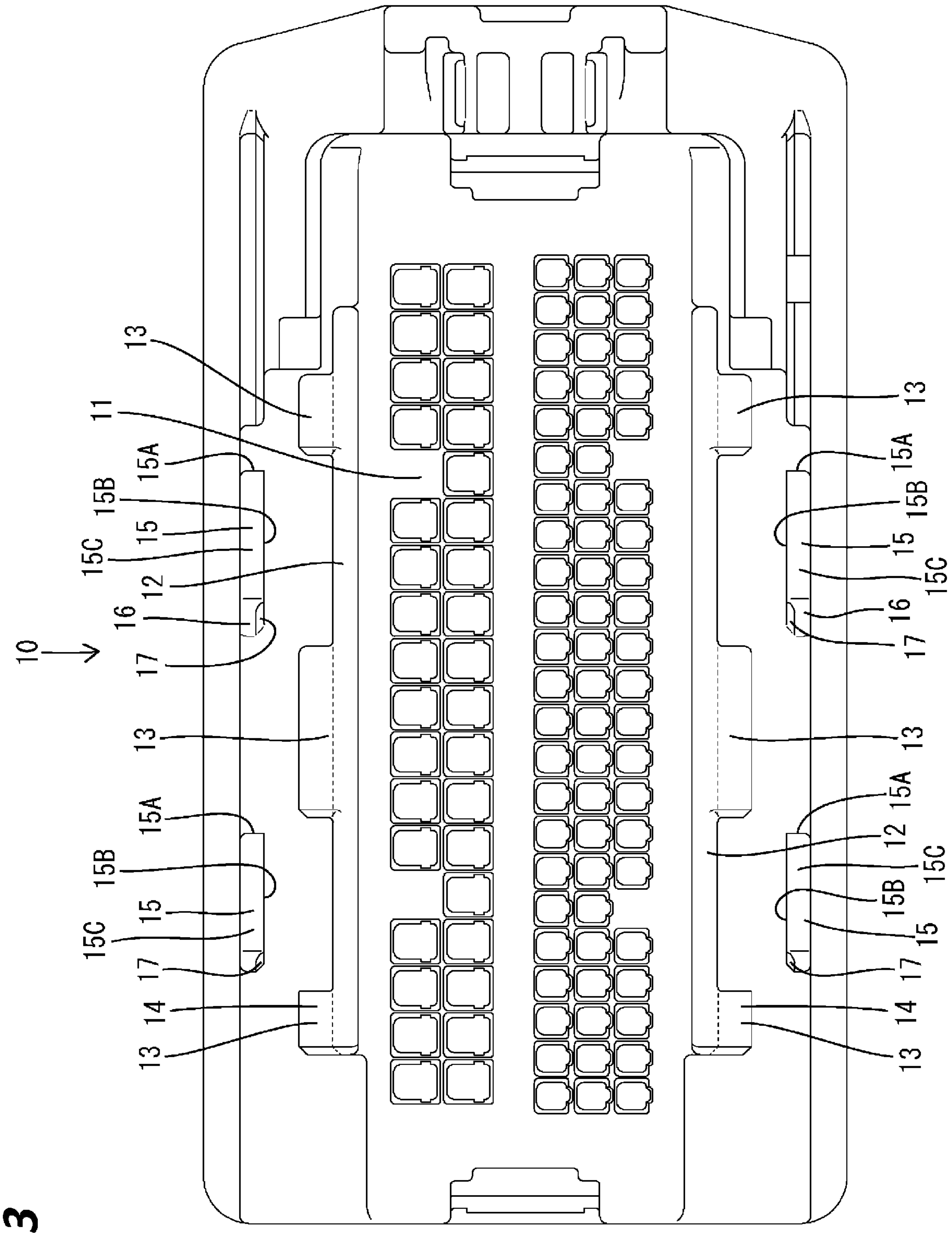
FIG. 3 is a plan view of the housing.
Figure 4:
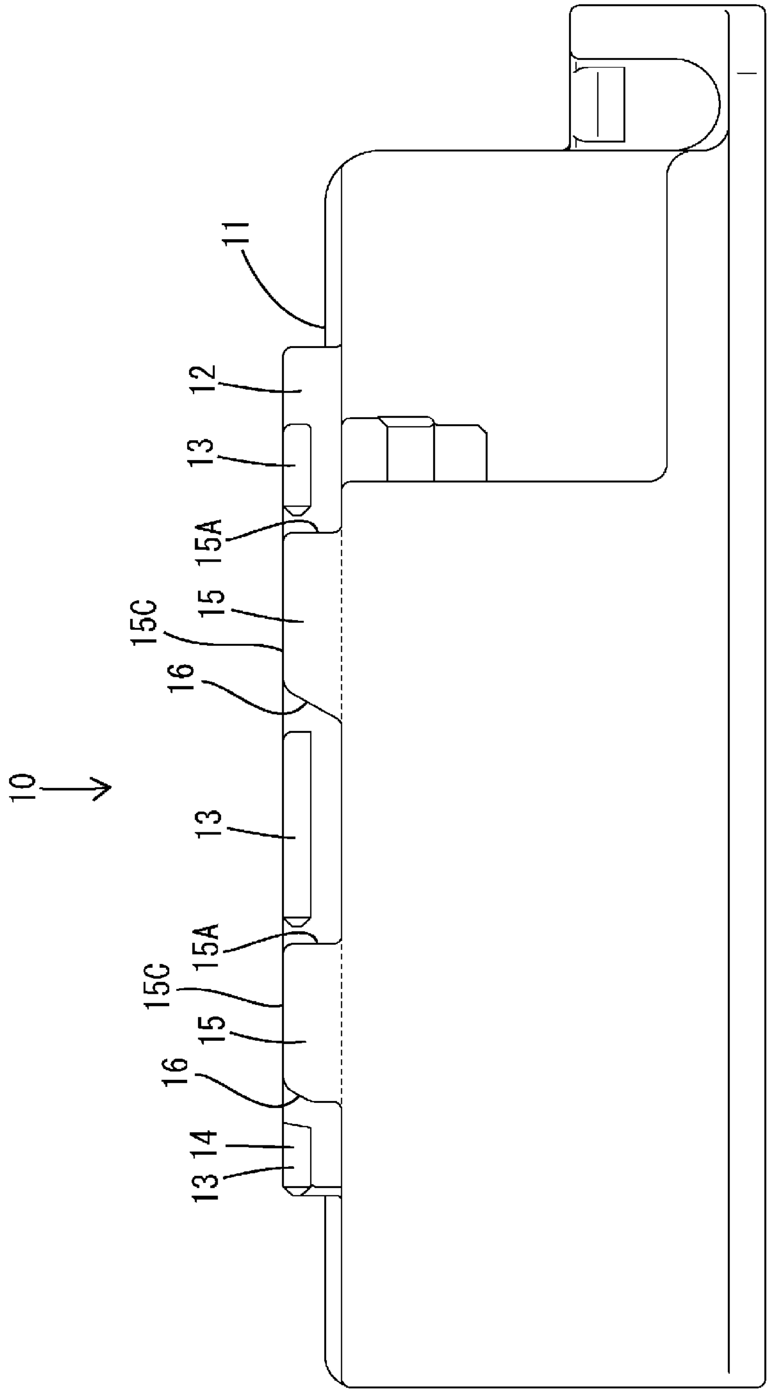
FIG. 4 is a side view of the housing.

As shown in FIGS. 2 to 4, guide frames 12 are respectively provided on the left and right sides of the wire lead-out surface 11 (two sides of the wire lead-out surface 11 in a direction orthogonal to a sliding direction). The guide frames 12 protrude upward from the wire lead-out surface 11. Each guide frame 12 is elongated in the front-rear direction.

As shown in FIGS. 2 to 4, each guide frame 12 is provided with rail portions 13. The rail portions 13 are fitted to corresponding rail-receiving portions 25 provided in the wire cover 20 (see FIG. 5). The rail portions 13 protrude outward from the upper end of each guide frame 12 (the rail portions 13 provided on the right guide frame 12 protrude rightward, and the rail portions 13 provided on the left guide frame 12 protrude leftward).

As shown in FIGS. 2 to 4, three rail portions 13 are provided spaced apart from each other in the front-rear direction. The three rail portions 13 are lined up in a straight line. Each rail portion 13 is longer in the front-rear direction than it is in the left-right direction. Among the three rail portions 13, the front-rear lengths of the rail portion 13 disposed at the front end and the rail portion 13 disposed at the rear end are smaller than the front-rear length of the rail portion 13 provided at the center in the front-rear direction. The rail portion 13 disposed at the rear end also functions as a lock-receiving portion 14 to which a lock portion 27 of the wire cover 20 is locked.

As shown in FIGS. 2 to 4, the housing 10 has slide-receiving portions 15. As shown in FIG. 1, slide portions 22 provided on the wire cover 20 slide against the slide-receiving portions 15 when the wire cover 20 is being attached. The slide-receiving portions 15 protrude upward (the lead-out direction of the wires W) from the wire lead-out surface 11.

As shown in FIGS. 2 and 3, the slide-receiving portions 15 are provided at positions (on left and right sides) in line with the wire lead-out surface 11. The slide-receiving portions 15 provided on the left side of the wire lead-out surface 11 are walls that protrude along the left side surface of the housing 10. The slide-receiving portions 15 provided on the right side of the wire lead-out surface 11 are walls that protrude upward along the right side surface of the housing 10.

As shown in FIG. 3, the slide-receiving portions 15 are located outward of the rail portions 13 (the right slide-receiving portions 15 are located rightward of the right rail portions 13, and the left slide-receiving portions 15 are located leftward of the left rail portions 13).

As shown in FIG. 3, the rear surfaces of the slide-receiving portions 15 are each provided with a second guiding portion 17. Each second guiding portion 17 is formed on an inner corner portion of the rear surface of the corresponding slide-receiving portion 15 (a corner portion on the left side of the right slide-receiving portions 15, and a corner portion on the right side of the left slide-receiving portions 15). The second guiding portion 17 is an inclined surface that is inclined inward in the wire cover 20 while extending forward (forward in the moving direction of the wire cover 20). The second guiding portion 17 is formed extending the entire length between the upper and lower ends of the slide-receiving portion 15.

As shown in FIG. 4, two slide-receiving portions 15 are provided spaced apart from each other in the front-rear direction, on each of the left and right sides of the housing 10. Each slide-receiving portion 15 is longer in the front-rear direction than it is in the vertical direction. The vertical length of the slide-receiving portion 15 is equal to the vertical length of the guide frame 12.

As shown in FIG. 4, the rear surface of each slide-receiving portion 15 is provided with an inclined surface 16 that is inclined upward while extending forward. The inclined surface 16 of the front slide-receiving portion 15 is formed extending the entire length between the upper and lower ends of the front slide-receiving portion 15. The inclined surface 16 of the rear slide-receiving portion 15 is formed in a smaller vertical range than the inclined surface 16 of the front slide-receiving portion 15 is. A front surface 15A of each slide-receiving portion 15 is perpendicular to the wire lead-out surface 11.

Figure 5:
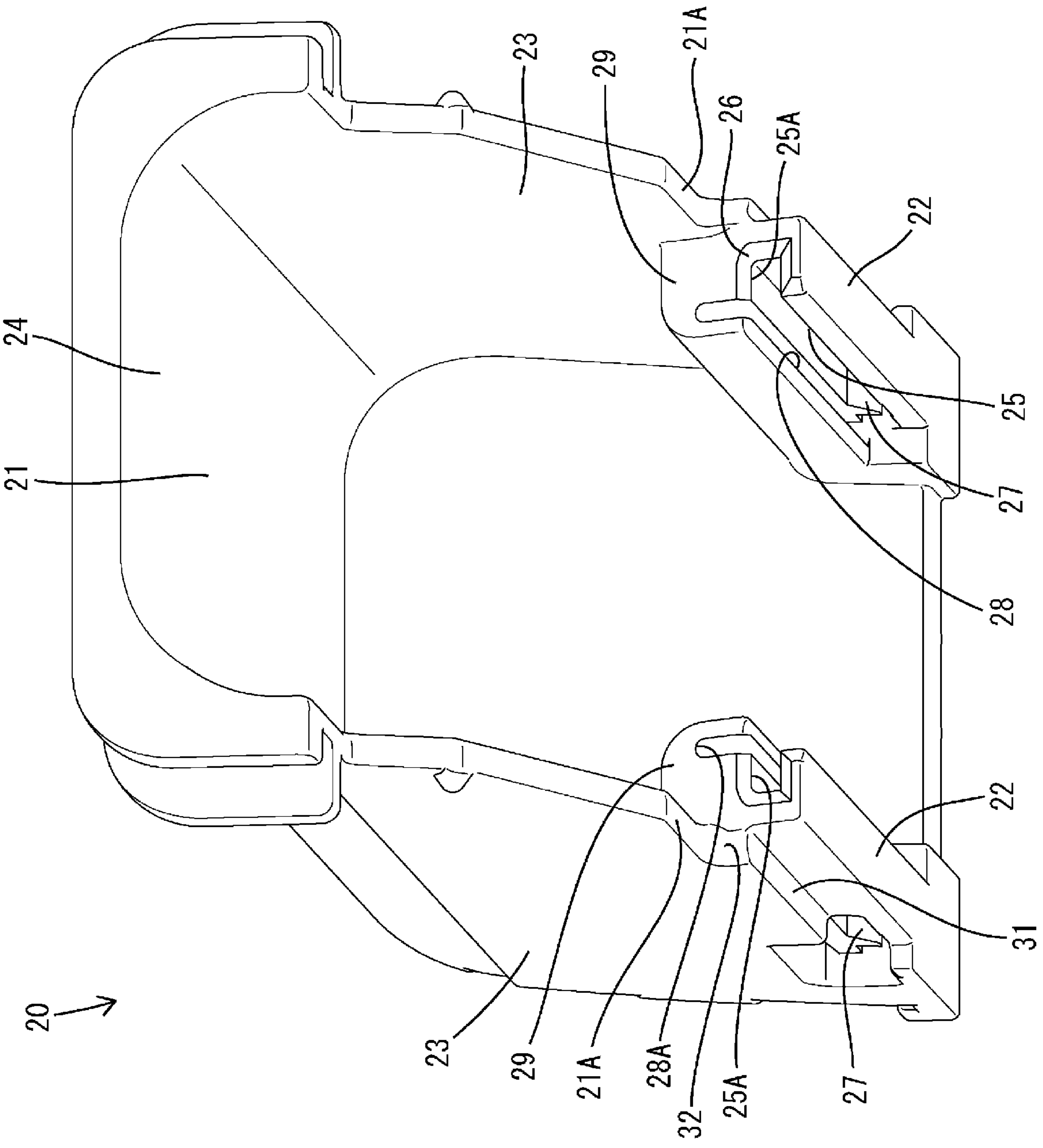
FIG. 5 is a perspective view of a wire cover.
Figure 6:
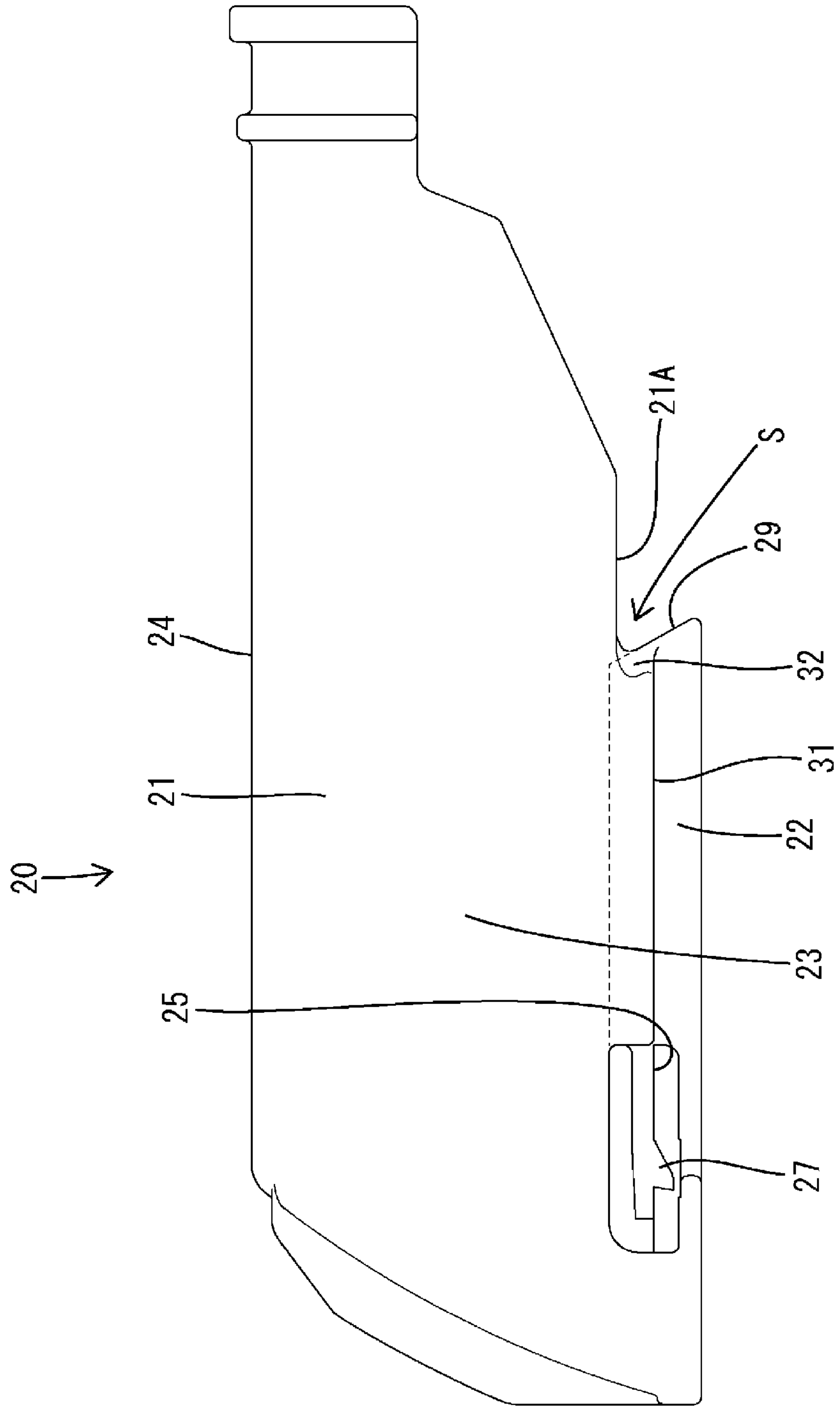
FIG. 6 is a side view of the wire cover.

The wire cover 20 is moved along the wire lead-out surface 11 and attached to the housing 10. The wire cover 20 is made of a synthetic resin. As shown in FIGS. 5 and 6, the wire cover 20 has a main body portion 21 and slide portions 22. The main body portion 21 has a cap shape that is elongated in the front-rear direction. The main body portion 21 includes a pair of left and right side surface portions 23 and an upper surface portion 24 that connects the upper ends of the pair of side surface portions 23. The upper surface portion 24 opposes the wire lead-out surface 11 when the wire cover 20 is attached to the housing 10. The lower face and the front face of the main body portion 21 are open.

When attaching the wire cover 20 to the housing 10, the slide portions 22 are slid along the slide-receiving portions 15 of the housing 10. As shown in FIG. 5, the pair of slide portions 22 are provided on the left and right sides of the wire cover 20. The left and right slide portions 22 are symmetrical with respect to the center in the left-right direction of the wire cover 20.

As shown in FIGS. 5 and 6, the slide portions 22 are elongated in the front-rear direction along respective bottom edges of the side surface portions 23 of the main body portion 21. The slide portions 22 protrude inward of the side surface portions 23 (the left slide portion 22 protrudes rightward of the left side surface portion 23, and the right slide portion 22 protrudes leftward of the right side surface portion 23).

Figure 7:
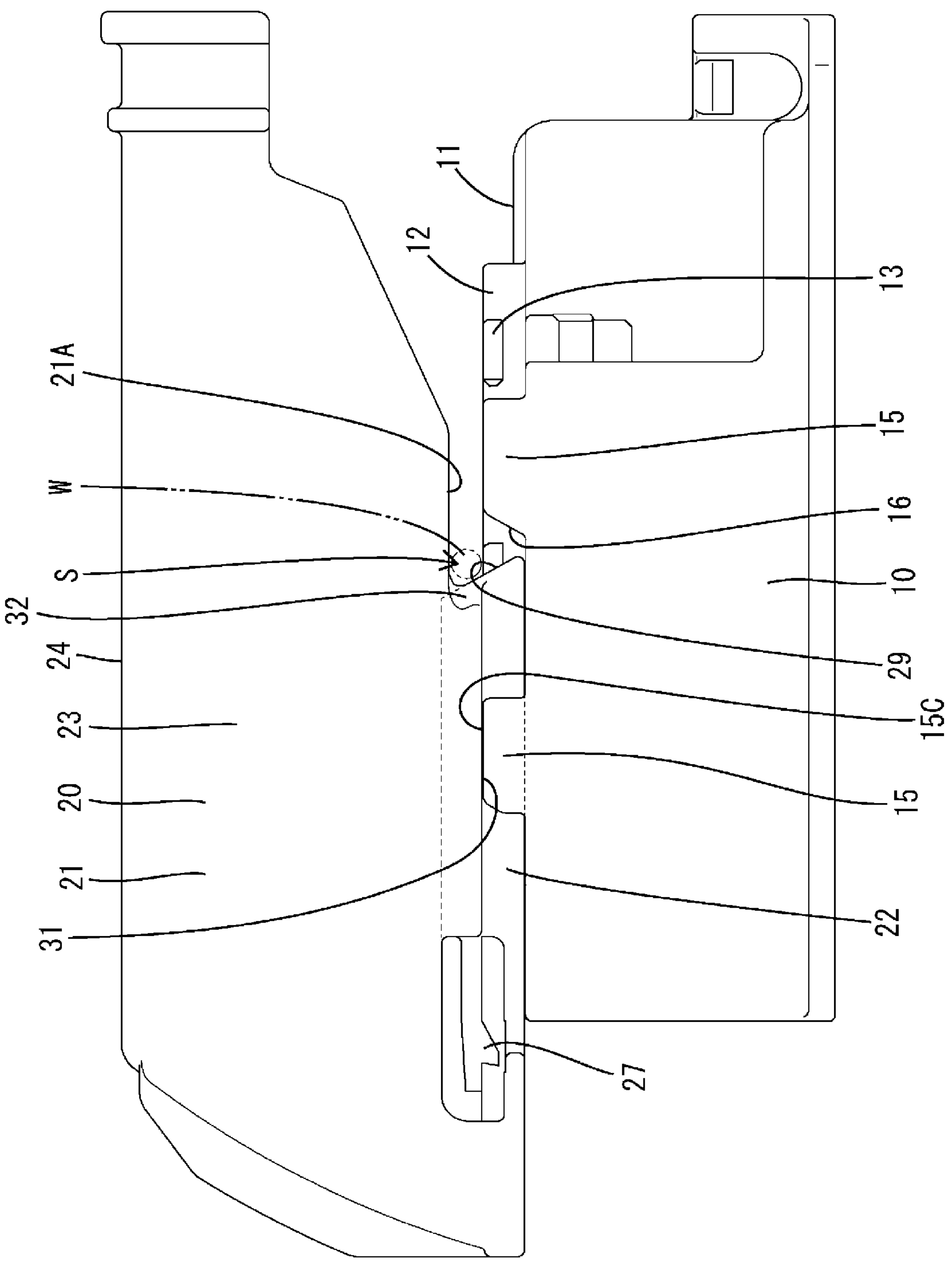
FIG. 7 is a side view of the wire cover-equipped connector showing the wire cover being attached to the housing.

As shown in FIG. 5, a sliding surface 31 is provided on the outer surface of each slide portion 22 (the right surface of the right slide portion 22 and the left surface of the left slide portion 22). The sliding surface 31 extends rearward from the front end of the slide portion 22. As shown in FIG. 7, the sliding surfaces 31 slide along upper surfaces 15C of the slide-receiving portions 15 of the housing 10.

Figure 8:
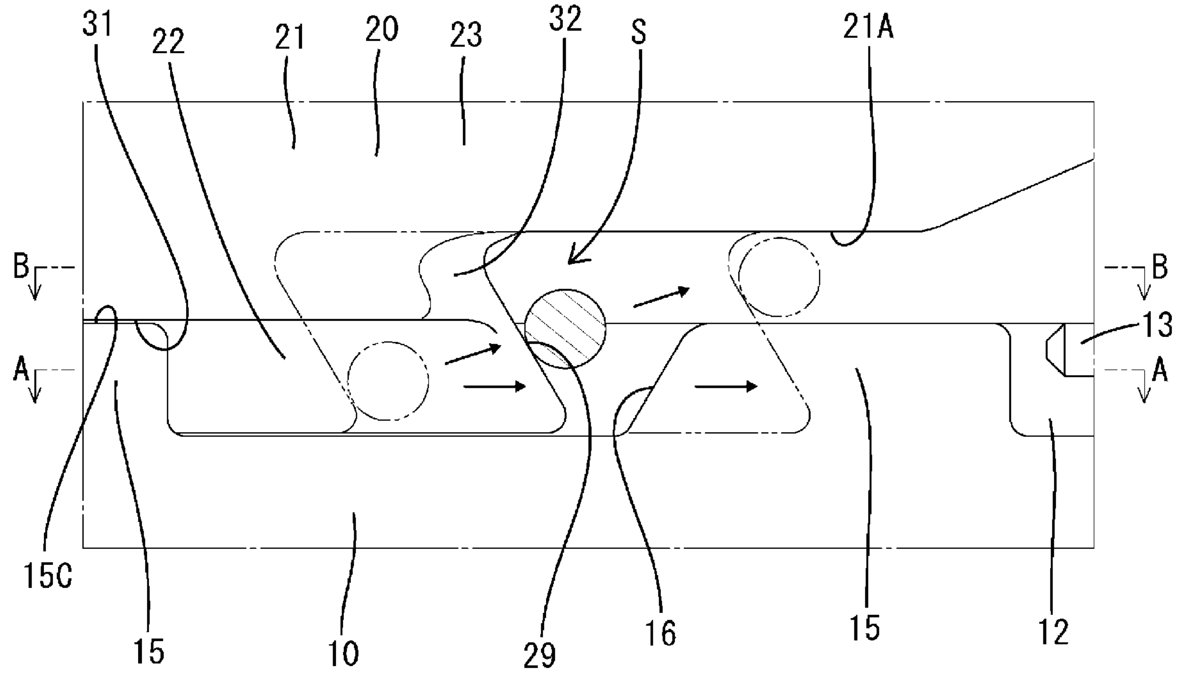
FIG. 8 is a partially enlarged side view of the wire cover-equipped connector schematically showing a wire being guided to a wire escape space by a wire guiding portion.
Figure 10:
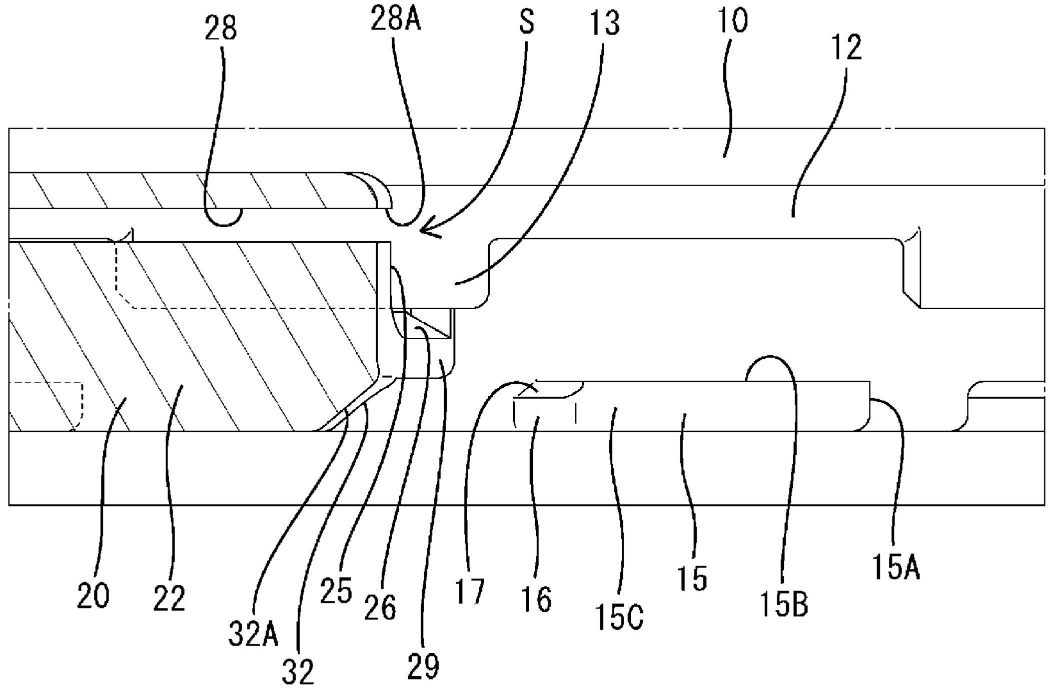
FIG. 10 is a partially enlarged cross-sectional view of the wire cover-equipped connector showing the vicinity of the slide portion of the wire cover that is being moved, and is a cross-sectional diagram that corresponds to a cross-section taken at the position B-B in FIG. 8.

As shown in FIGS. 8 and 10, the front end of each slide portion 22 is provided with an escape recess 32. The escape recess 32 is formed outward of the front end of the slide portion 22 (the right escape recess 32 is provided on the right side of the corresponding slide portion 22, and the left escape recess 32 is provided on the left side of the corresponding slide portion 22). The escape recess 32 is provided in a region above (in the lead-out direction of the wires W) the upper surfaces (protruding ends) 15C of the slide-receiving portions 15. The escape recess 32 has a recessed inclined surface 32A that is inclined outward while extending toward the rear side. The lower end of the recessed inclined surface 32A is continuous with the front end of the sliding surface 31. The upper end of the recessed inclined surface 32A is continuous with a lower edge 21A of the main body portion 21.

As shown in FIG. 5, each slide portion 22 is provided with a rail-receiving portion 25 to which the corresponding rail portions 13 of the housing 10 are fitted. The rail-receiving portion 25 is a groove that is recessed outward from the inner surface of the slide portion 22 (the right surface of the left slide portion 22 and the left surface of the right slide portion 22).

The rail-receiving portion 25 includes an opening portion 25A in the front surface of the slide portion 22. The opening portion 25A of the rail-receiving portion 25 is an access port for the rail portion 13. The opening portion 25A of the rail-receiving portion 25 is provided with a tapered portion 26 that guides in the rail portion 13. The tapered portion 26 is inclined such that the size of the opening portion 25A in the left-right and vertical directions decreases rearward.

As shown in FIG. 5, the slide portion 22 is provided with a second groove 28 that is separate from the rail-receiving portion 25. The second groove 28 is a groove that is recessed upward from the upper surface of the rail-receiving portion 25. The second groove 28 has an opening portion 28A in the front surface of the slide portion 22. The opening portion 28A of the second groove 28 has an elongated shape in the vertical direction. The lower end of the opening portion 28A of the second groove 28 is continuous with the inner end portion of the opening portion 25A of the rail-receiving portion 25. The opening portion 28A of the second groove 28 and the opening portion 25A of the rail-receiving portion 25 intersect each other at a right angle.

As shown in FIG. 6, the rear end portion of the slide portion 22 is provided with the lock portion 27 that locks to the lock-receiving portion 14 provided in the housing 10. The lock portion 27 protrudes downward from the upper surface of the rail-receiving portion 25. The lock portion 27 can be elastically displaced in the vertical direction.

As shown in FIG. 6, the rail-receiving portion 25 is provided at a position lower than the lower edge 21A of the main body portion 21. In a state where the wire cover 20 is attached to the housing 10, the lower edges 21A of the main body portion 21 extend parallel to the upper ends of the slide portions 22. A gap larger than the outer diameter of a wire W is formed between the lower edge 21A of the main body portion 21 and the upper end of the slide portion 22. The gap between the lower edge 21A of the main body portion 21 and the upper end of the slide portion 22 is open forward.

As shown in FIG. 7, the slide portion 22 includes a wire guiding portion 29 that guides a wire W located forward of the slide portion 22 into a wire escape space S. Wire escape spaces S are located forward of the front surfaces of the slide portions 22, respectively. The wire escape spaces S are distanced from the slide-receiving portions 15 in a direction orthogonal to the wire lead-out surface 11. Each wire escape space S is located at a position higher than the rail-receiving portion 25. The wire escape spaces S are formed inward of the side surface portions 23 (the left wire escape space S is on the right side of the left side surface portion 23 and the right wire escape space S is on the left side of the right side surface portion 23). The wire escape spaces S are provided at positions shifted upward (in the lead-out direction of the wires W) from the upper surfaces 15C of the slide-receiving portions 15.

The wire guiding portion 29 is an inclined surface that is formed on the front surface of the slide portion 22. The wire guiding portion 29 is inclined toward the wire escape space S while extending from the front end toward the rear end. In other words, the wire guiding portion 29 is inclined rearward (in a direction in which the wire cover 20 is removed from the housing 10) while extending from the lower end to the upper end. The wire guiding portion 29 is formed in a region inward of the escape recess 32, in the front surface of the slide portion 22 (see FIG. 5). As shown in FIG. 8, in a state where the wire guiding portion 29 and the inclined surface 16 of the slide-receiving portion 15 face each other in the front-rear direction, the distance between the wire guiding portion 29 and the inclined surface 16 in the front-rear direction increases upward. The wire guiding portion 29 has an incline that is the inverse of that of the inclined surface 16 of the slide-receiving portion 15.

Next, an example of operations for assembling the wire cover-equipped connector C will be described.

First, terminal fittings are housed in the housing 10. The terminal fittings fixed to terminal ends of the wires W are inserted into terminal housing chambers 18 from the wire lead-out surface 11 side of the housing 10. Once the terminal fittings are housed in the terminal housing chambers 18, the wires W enter a state where they extend from the wire lead-out surface 11.

Figure 9:
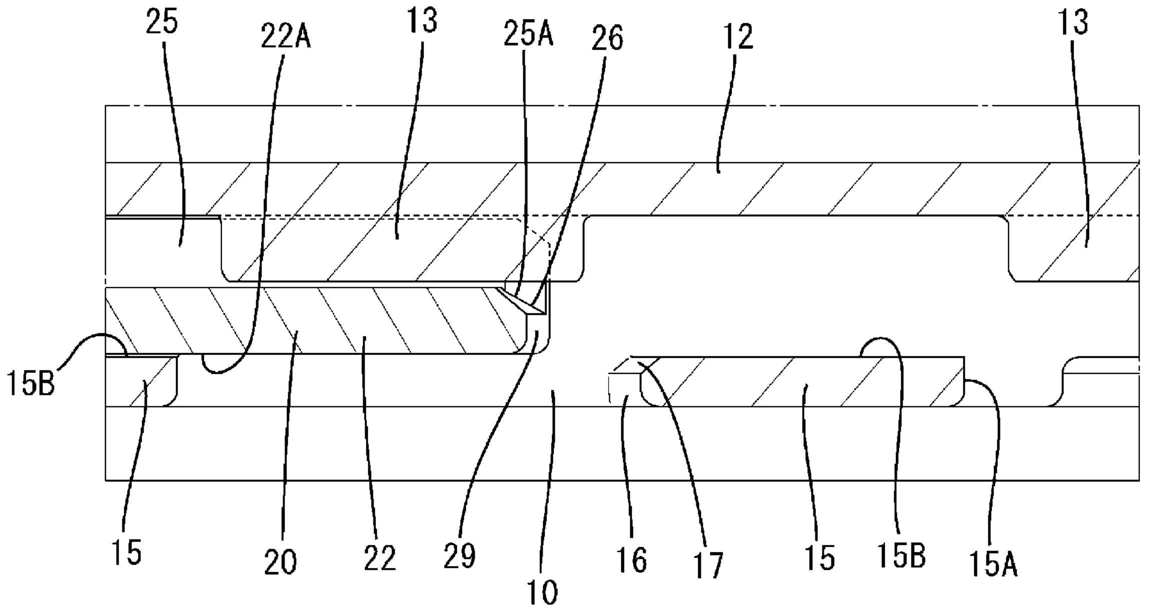
FIG. 9 is a partially enlarged cross-sectional view of the wire cover-equipped connector showing the vicinity of a slide portion of the wire cover that is being moved, and is a cross-sectional diagram that corresponds to a cross-section taken at the position A-A in FIG. 8.

Next, the wire cover 20 is attached to the housing 10. Specifically, first, the front end portions of the rail-receiving portions 25 of the wire cover 20 are respectively fitted to the rail portions 13 at the rear end of the housing 10 from the rear side. In doing so, as shown in FIG. 8, the sliding surfaces 31 of the slide portions 22 of the wire cover 20 extend along the upper surfaces 15C of the slide-receiving portions 15 of the housing 10. Also, as shown in FIG. 9, outer side surfaces 22A of the slide portions 22 of the wire cover 20 extend along inner side surfaces 15B of the slide-receiving portions 15 of the housing 10. Specifically, the left side surface of the right slide-receiving portion 15 extends along the right side surface of the right slide portion 22, and the right side surface of the left slide-receiving portion 15 extends along the left side surface of the left slide portion 22.

Next, the wire cover 20 is moved forward. The wire cover 20 is guided in a straight line due to the rail portions 13 being fitted to the rail-receiving portions 25. The bundle of electric wires W are bent inward in the main body portion 21 along with the movement of the wire cover 20. At this time, there are cases where a wire W may extend out from the main body portion 21 (on the left or right side of the main body portion 21). As shown in FIG. 8, the wire W extending out from the main body portion 21 comes in contact with the wire guiding portion 29 of the slide portion 22, and is moved to the wire escape space S as the wire cover 20 moves forward. Here, before the wire W is completely moved to the wire escape space S, the distance in the front-rear direction between the wire guiding portion 29 and the inclined surface 16 may become smaller than the outer diameter of the wire W. In this case, the wire W can escape to the escape recess 32 formed in the front end of the slide portion 22. Accordingly, the wire W can be prevented from being pinched between the wire guiding portion 29 and the inclined surface 16. In this manner, the wire W is guided to a position above the upper end of the slide-receiving portion 15 so as to not become pinched between the wire guiding portion 29 and the inclined surface 16. Also, the wire W comes in contact with the second guiding portion 17 of the slide-receiving portion 15 and is guided into the main body portion 21. Here, even if the wire W is not entirely positioned inside the main body portion 21, the wire W can be prevented from being pinched between the slide portion 22 and the slide-receiving portion 15, as a result of being positioned between the lower end 21A of the main body portion 21 and the upper surface 15C of the slide-receiving portion 15.

Ultimately, the wire cover 20 reaches the correct attachment position, and the lock portions 27 lock to the lock-receiving portions 14, respectively. With the above, the operations for assembling the wire cover-equipped connector C are completed.

Next, operation and effects of the wire cover-equipped connector C with the aforementioned configuration will be described.

The wire cover-equipped connector C includes the housing 10 and the wire cover 20. The housing 10 has the wire lead-out surface 11. The wire cover 20 is disposed on the housing 10 so as to cover the wire lead-out surface 11. The housing 10 has the slide-receiving portions 15 that are provided at positions in line with the wire lead-out surface 11. The wire cover 20 has the slide portions 22 that slide against the slide-receiving portions 15, and the wire escape spaces S formed so as to be separated from the slide-receiving portions 15. Each slide portion 22 has, in the front end thereof in the sliding direction of sliding against the slide-receiving portions 15, the wire guiding portion 29 that is inclined rearward (opposite to the sliding direction) while extending toward the wire escape space S.

With this configuration, when the wire cover 20 is attached to the housing 10, a wire W located forward of the slide portion 22 of the wire cover 20 is guided away from the slide-receiving portion 15 by the wire guiding portion 29. Accordingly, when attaching the wire cover 20, the wire W can be prevented from being caught on the slide portion 22 of the wire cover 20.

The slide-receiving portions 15 are walls provided at positions where they overlap the slide portions 22 from the outside. With this configuration, when attaching the wire cover 20, a wire W that comes in contact with the wire guiding portion 29 moves along the incline of the wire guiding portion 29 and into the wire escape space S, and thus the wire W is prevented from being pinched between the slide-receiving portion 15 and the slide portion 22.

The slide-receiving portions 15 protrude in the lead-out direction of the wires W, from the wire lead-out surface 11. The wire escape spaces S are formed at positions shifted upward from the upper surfaces 15C of the slide-receiving portions 15. With this configuration, a wire W is moved to a position shifted away from the slide-receiving portions 15, and thus the wire W can be prevented from being pinched between the wire cover 20 and the housing 10.

The front end of each slide portion 22 is provided with the escape recess 32 that is recessed rearward. With this configuration, a wire W is moved into the escape recess 32 in the front end of the slide portion 22, and the wire W can be prevented from being pinched between the slide portion 22 and the slide-receiving portion 15.

Each slide-receiving portion 15 has an inclined second guiding portion 17 that is inclined inward in the wire cover 20 while extending forward in the sliding direction. With this configuration, if a wire W comes in contact with the second guiding portion 17 provided on the slide-receiving portion 15, the wire W is guided inward in the wire cover 20.

Thus, when the wire cover 20 is being attached, the wire W can be prevented from being caught on the slide portion 22 of the wire cover 20.

Other Embodiments of Present Disclosure

The disclosed embodiments are exemplary in all regards and are not to be considered limiting.

(1) In the above embodiment, the slide-receiving portions 15 protrude upward from the wire lead-out surface 11, but in another embodiment, a slide-receiving portion may protrude rightward from the right side surface of the housing and leftward from the left side surface of the housing.

(2) In the above embodiment, the rear surface of each slide-receiving portion 15 is provided with the second guiding portion 17, but in another embodiment, the second guiding portion may be provided on a slide portion of the wire cover. In this case, the front surface of the slide portion may be provided with the second guiding portion.

(3) In the above embodiment, the slide portions 22 are located inward of the slide-receiving portions 15, but in another embodiment, the slide portions may be located outward of the slide-receiving portions.

(4) Examples of the number of and shapes of the slide portions 22 and the slide-receiving portions 15 were given in the above embodiment, but in another embodiment, the number and shapes of slide portions and slide-receiving portions may be changed.

(5) In the above embodiment, the wire guiding portion 29 is an inclined surface, but in another embodiment, the guiding portion may be a curved surface.

(6) In the above embodiment, the escape recess 32 has the recessed inclined surface 32A, but in another embodiment, the escape recess may have a curved recessed surface or the like instead of an inclined surface.

LIST OF REFERENCE NUMERALS

C Wire cover-equipped connector
S Wire escape space
W Wire
10 Housing
11 Wire lead-out surface
12 Guide frame
13 Rail portion
14 Lock-receiving portion
15 Slide-receiving portion
15A Front surface
15B Inner surface
15C Upper surface
16 Inclined surface
17 Second guiding portion
18 Terminal housing chamber
20 Wire cover
21 Main body portion
21A Lower edge
22 Slide portion
22A Outer surface
23 Side surface portion
24 Upper surface portion
25 Rail-receiving portion
25A Opening portion
26 Tapered portion
27 Lock portion
28 Second groove
28A Opening portion
29 Wire guiding portion
31 Sliding surface
32 Escape recess
32A Recessed inclined surface

What is claimed is:

1. A wire cover-equipped connector comprising:
a housing including a wire lead-out surface; and
a wire cover configured to be disposed on the housing so as to cover the wire lead-out surface,
wherein the housing includes a slide-receiving portion at a position in line with the wire lead-out surface,
the wire cover includes a slide portion configured to slide against the slide-receiving portion, and a wire escape space formed so as to be separated from the slide-receiving portion, and
the slide portion includes, in a front end thereof in a sliding direction of sliding against the slide-receiving portion, a wire guiding portion inclined in a direction opposite to the sliding direction while extending toward the wire escape space.

2. The wire cover-equipped connector according to claim 1,
wherein the slide-receiving portion is a wall provided at a position where the slide-receiving portion overlaps the slide portion in an inner/outer direction of the wire cover.

3. The wire cover-equipped connector according to claim 1,
wherein the slide-receiving portion protrudes in a lead-out direction in which the wire is lead out from the wire lead-out surface, and
the wire escape space is formed at a position shifted in the lead-out direction of the wire relative to a protruding end of the slide-receiving portion.

4. The wire cover-equipped connector according to claim 1,
wherein the slide portion includes, in the front end thereof in the sliding direction, an escape recess that is recessed rearward in the sliding direction.

5. The wire cover-equipped connector according to claim 1,
wherein the slide-receiving portion includes an inclined second guiding portion inclined inward in the wire cover while extending forward in the sliding direction.

* * * * *